(12) United States Patent
Boyd et al.

(10) Patent No.: US 7,494,150 B2
(45) Date of Patent: Feb. 24, 2009

(54) AIR BAG INFLATOR VIBRATION DAMPER

(75) Inventors: Ted Boyd, Knoxville, TN (US); Mike Strong, Knoxville, TN (US)

(73) Assignee: ARC Automotive, Inc., Knoxville, TN (US)

( * ) Notice: Subject to any disclaimer, the term of this patent is extended or adjusted under 35 U.S.C. 154(b) by 226 days.

(21) Appl. No.: 11/397,889

(22) Filed: Apr. 5, 2006

(65) Prior Publication Data
US 2007/0235988 A1    Oct. 11, 2007

(51) Int. Cl.
*B60R 21/16* (2006.01)
(52) U.S. Cl. .................................. 280/728.2
(58) Field of Classification Search ............ 280/728.2, 280/731, 736
See application file for complete search history.

(56) References Cited

U.S. PATENT DOCUMENTS

| | | | | |
|---|---|---|---|---|
| 6,361,065 B1 * | 3/2002 | Frisch | ...................... | 280/728.2 |
| 6,435,540 B1 * | 8/2002 | Durre | ...................... | 280/728.2 |
| 6,712,383 B2 * | 3/2004 | Asic et al. | ................ | 280/728.2 |
| 6,814,369 B2 * | 11/2004 | Heindl | .................... | 280/728.2 |
| 7,172,208 B2 * | 2/2007 | Lodholz et al. | .......... | 280/728.2 |
| 2003/0038462 A1 * | 2/2003 | Leibach et al. | .............. | 280/731 |
| 2004/0007854 A1 * | 1/2004 | Webber et al. | ........... | 280/728.2 |
| 2004/0041381 A1 * | 3/2004 | Fangmann et al. | .......... | 280/740 |

FOREIGN PATENT DOCUMENTS

| | | |
|---|---|---|
| DE | 19908915 | 9/2000 |
| DE | 10110912 | 9/2002 |
| EP | 1026050 | 8/2000 |
| EP | 1065110 | 1/2001 |
| EP | 1101662 | 5/2001 |
| EP | 1101663 | 5/2001 |
| EP | 1136328 | 9/2001 |
| JP | 2003034217 | 2/2003 |
| JP | 2004042815 | 2/2004 |

* cited by examiner

*Primary Examiner*—John Q. Nguyen
*Assistant Examiner*—Robert A. Coker
(74) *Attorney, Agent, or Firm*—Nixon & Vanderhye PC

(57) ABSTRACT

A vibration damper for connecting an inflator to an air bag module in a vehicle steering column or the like. The vibration damper comprises a flexible and resilient, annular damper member having a first end portion connected to a diffuser for the inflator, and a second opposite end portion connected to an interface member. The diffuser is connected to an inflator ring that is constructed to be connected to the inflator. The interface member is constructed to be connected to the air bag module.

15 Claims, 2 Drawing Sheets

AIR BAG INFLATOR VIBRATION DAMPER

BACKGROUND OF THE INVENTION

1. Field of the Invention

The present invention relates to a vibration damper for an airbag inflator and, more particularly, to such a vibration damper which is positioned between an inflator and an airbag module in a steering column of a motor vehicle.

2. Description of Related Art

The vibrations that arise in motor vehicles during movement or idling thereof with the motor running are, in many cases, transmitted to the steering column and then to the steering wheel. To dampen these vibrations at the steering wheel and to improve driving comfort, various types of vibration damper devices have been mounted within the steering column. In some cases, the vibration damper device has been integrated with the airbag inflator assembly mounted within the steering column and, in other cases, it has been separate therefrom.

Such vibration damper devices have been subject to one or more of the following disadvantages:

1. They have been complicated in construction;
2. They have been difficult to install;
3. They have been difficult and/or expensive to manufacture;
4. They have been unreliable in operation; and/or
5. They have occupied too much space in the steering column.

The vibration damper of the present invention is not subject to any of the above-mentioned disadvantages and possesses certain advantages that are not found in prior art damper devices of the same general type.

SUMMARY OF THE INVENTION

The vibration damper of the present invention comprises an annular, flexible and resilient damper member formed of any suitable material such as rubber, thermoplastic elastomers, or thermoset elastomers. The damper member may be in the form of a truncated cone, may be cylindrical, or may have any other suitable shape. It is attached at its ends in any suitable manner to two substantially rigid interface members formed of any suitable material, e.g., a metal such as steel or aluminum. As an illustrative example, the damper member may be molded to the interface members.

One of the interface members is the diffuser manifold for the air bag inflator. The diffuser has an outwardly extending annular rim portion at its lower end that is connected to the damper member. The lower portion of the diffuser is connected to and surrounds the upper portion of an inflator ring of any suitable construction and formed of any suitable material such as steel. As an illustrative example, the diffuser may be crimped onto the inflator ring. The inflator ring is constructed to be connected to the outer surface of the inflator in any suitable manner such as by welding.

The other interface member is in the form of an annular mounting flange of any suitable shape or construction for connecting the damper and inflator to the air bag module in the steering column.

This damper construction allows the inflator some freedom of movement so as to dampen vibration in the steering column and to eliminate the need for a separate damper system within the steering column. Also, the damper of the present invention can be mounted or installed after the inflator assembly is completed to thereby alleviate any concern for the potential in some cases of Helium mass spec inaccuracy that may be caused by the presence of elastic material on the exterior of the inflator during the manufacture thereof.

DETAILED DESCRIPTION OF THE INVENTION

Figure 1:
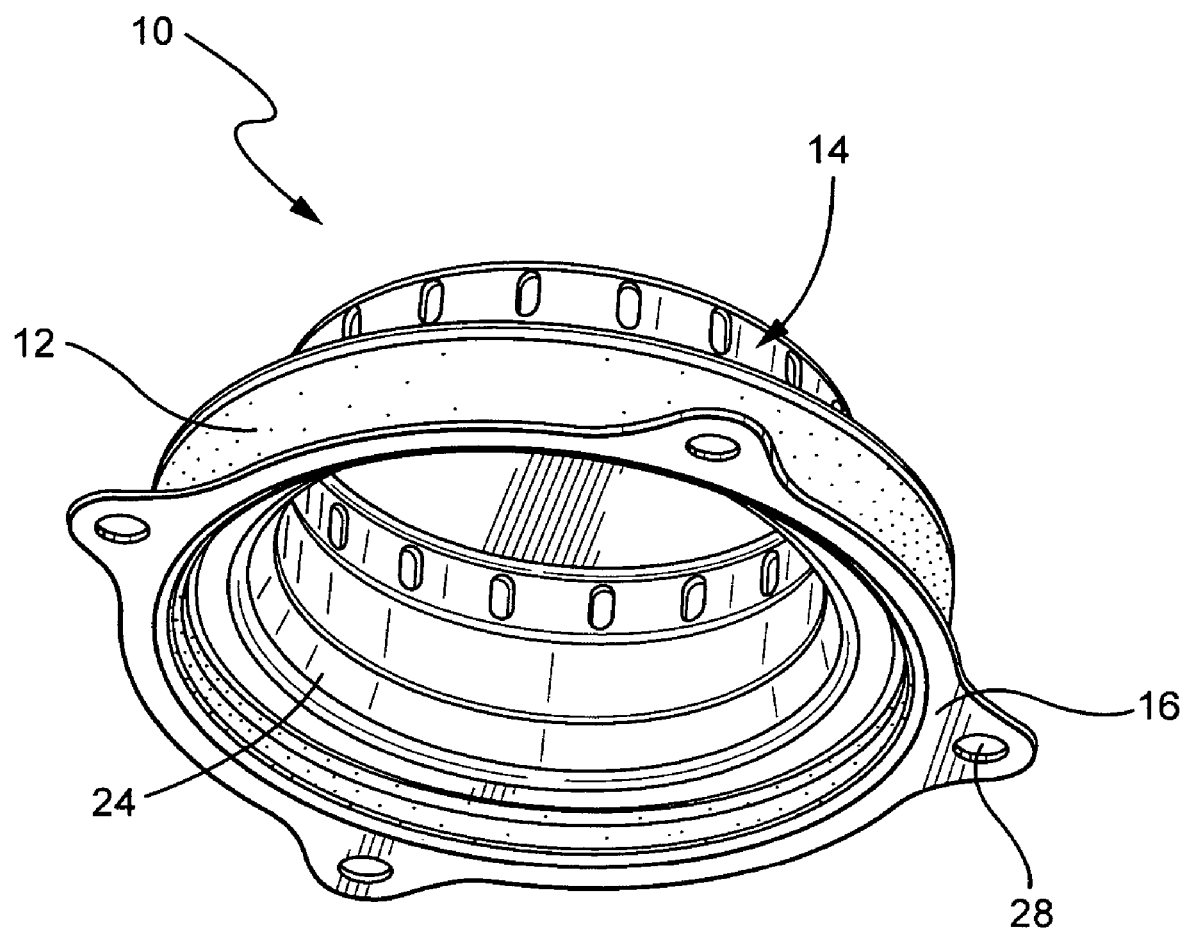
FIG. 1 is a perspective view of one embodiment of the vibration damper of the present invention.
Figure 2:
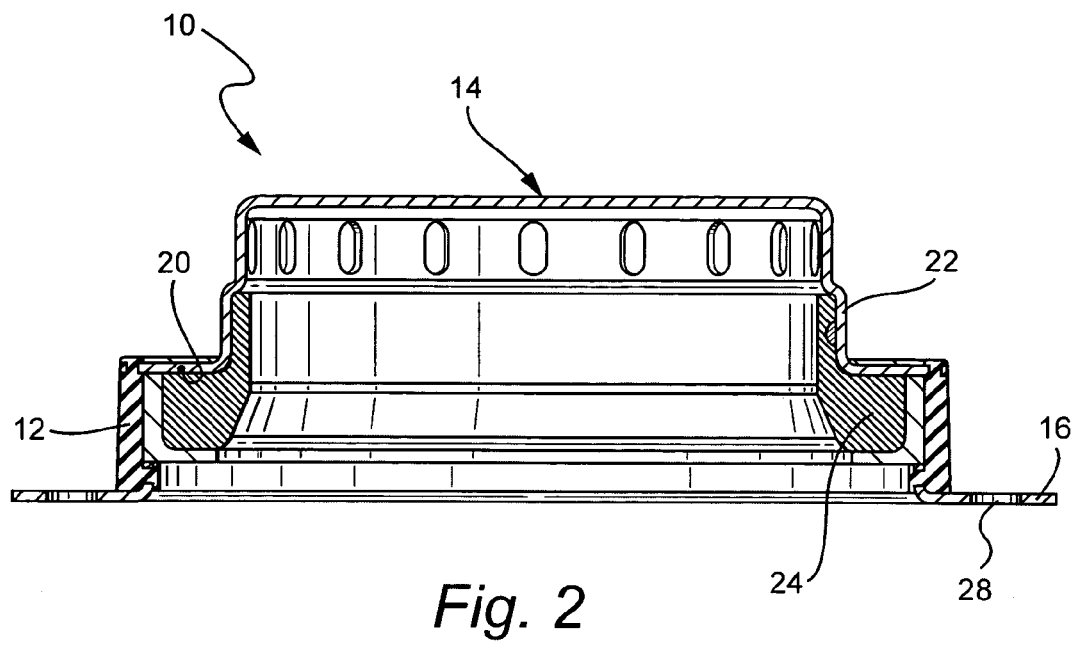
FIG. 2 is a side elevational view in section of the vibration damper shown in FIG. 1.
Figure 3:
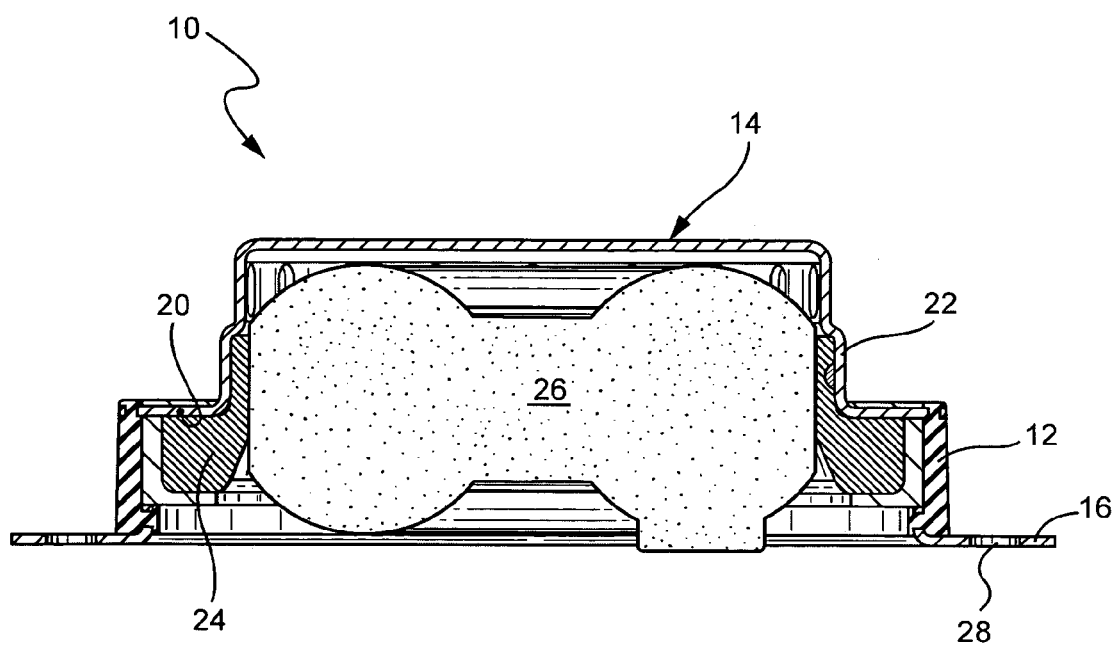
FIG. 3 is a side elevational view in section similar to FIG. 2 showing the vibration damper connected to an inflator.

Referring to FIGS. 1-3, the vibration damper 10 of the present invention generally comprises an annular, flexible and resilient damper member 12 that is secured at its ends to first and second, substantially rigid interface members 14 and 16, respectively. The purpose of the vibration damper 10 is to connect an inflator to an air bag module in a motor vehicle steering column or the like for the purpose of allowing the inflator some freedom of movement so as to dampen vibration in the steering column.

As shown in FIGS. 2 and 3, the damper member 12 may be in the form of a truncated cone or may have any other suitable annular shape such as cylindrical. The damper member 12 may be formed of any suitable, flexible and resilient material such as rubber, thermoplastic elastomers, or thermoset elastomers.

At its upper or first end portion, the damper member 12 is secured in any suitable manner to the first interface member 14 which is the diffuser manifold for the inflator and is formed of any suitable substantially rigid material, e.g., a metal such as aluminum or steel, or a suitable plastic material such as nylon, glass filed nylon, polypropylene, or glass filled polypropylene. As shown in FIGS. 2 and 3, the diffuser 14 comprises at its lower end an outwardly extending annular flange 20 that is connected to the first end portion of the damper member 12. The damper member 12 is connected to the flange 20 of the diffuser 14 in any suitable manner, such as by molding.

The lower portion 22 of the diffuser 14 is connected to and surrounds the upper portion of an inflator ring 24 of any suitable construction and formed of any suitable material such as steel. As an illustrative example, the diffuser 14 may be crimped onto the adjacent portion of the inflator ring 24 as shown in FIGS. 2 and 3. The inflator ring 24 is constructed to be connected to the outer surface of an inflator 26, as shown in FIG. 3, in any suitable manner such as by welding.

The lower or second end portion of the damper member 12 is connected to the second interface member 16 in any suitable manner, such as by molding. The second interface member 16 is a mounting flange of any suitable shape and may have apertures 28 therethrough to facilitate its connection to an air bag module (not shown). The second interface member 16 may be formed of any suitable material, e.g., a metal such as aluminum or steel, or a suitable plastic such as nylon, polypropylene, or glass filled polypropylene.

From the foregoing description, it will be apparent that the present invention provides a simple and effective vibration damper that may be easily installed in a motor vehicle steering column to allow the inflator some freedom of movement relative to the air bag module, and thereby dampen vibration in the steering column.

Advantageously, the vibration damper 10 of the present invention can be mounted or installed after the inflator assembly is complete to thereby alleviate any concern for the potential in some cases of Helium mass spec inaccuracy that may be caused by the presence of elastic material on the exterior of the inflator during the manufacture thereof.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A vibration damper for connecting an inflator to an air bag module in a vehicle steering column, said vibration damper comprising:
 a flexible and resilient annular damper member having a first end portion and a second opposite end portion;
 a first annular interface member connected to the first end portion of said damper member, said first interface member being a diffuser for an inflator;
 a substantially rigid inflator ring secured to the inner surface of said diffuser and being constructed to be connected to the outer surface of an inflator; and
a second annular interface member connected to the second end portion of said damper member, said second interface member being constructed to be connected to the air bag module.

2. The vibration damper of claim 1, wherein said damper member is formed of rubber, thermoplastic elastomer, or thermoset elastomer.

3. The vibration damper of claim 1, wherein said diffuser comprises an outwardly extending annular flange that is connected to said damper member.

4. The vibration damper of claim 1, wherein said inflator ring is constructed to be welded to the inflator.

5. The vibration damper of claim 1, wherein said damper member is molded to said first interface member and to said second interface member.

6. The vibration damper of claim 1, wherein said diffuser and said second interface member are formed of a rigid material.

7. An inflator construction for an air bag module in a vehicle steering column, said inflator construction comprising:
 a diffuser;
 a vibration damper comprising a flexible and resilient annular damper member having a first end portion and a second end portion, said diffuser being connected to said first end portion, a substantially rigid inflator ring secured to said diffuser, an inflator disposed within said diffuser and said vibration damper, said inflator being secured to said inflator ring, and an interface member connected to said second end portion and constructed to be connected to the air bag module.

8. The inflator construction of claim 7, wherein said damper member is formed of rubber, thermoplastic elastomer, or thermoset elastomer.

9. The inflator construction of claim 7, wherein said diffuser comprises an outwardly extending annular flange that is connected to said first end portion of said damper member.

10. The inflator construction of claim 7, wherein said inflator ring is welded onto the outer surface of said inflator.

11. The inflator construction of claim 7, wherein said damper member is molded to said diffuser and to said interface member.

12. The inflator construction of claim 7, wherein said diffuser and said interface member are formed of a rigid material.

13. The inflator construction of claim 7, wherein said interface member has a plurality of apertures therethrough to facilitate its connection to the air bag module.

14. A vibration damper for connecting an inflator to an air bag module in a vehicle steering column, said vibration damper comprising:
 a flexible and resilient annular damper member having a first end portion and a second opposite end portion;
 a first annular interface member connected to the first end portion of said damper member, said first interface member being a diffuser for an inflator;
 an inflator ring secured to the inner surface of said diffuser and being constructed to be connected to the outer surface of an inflator; and
a second annular interface member connected to the second end portion of said damper member, said second interface member being constructed to be connected to the air bag module;
said diffuser being crimped onto said inflator ring.

15. An inflator construction for an air bag module in a vehicle steering column, said inflator construction comprising:
 a diffuser;
 a vibration damper comprising a flexible and resilient annular damper member having a first end portion and a second end portion, said diffuser being connected to said first end portion, an inflator ring secured to said diffuser, an inflator disposed within said diffuser and said vibration damper, said inflator being secured to said inflator ring, and an interface member connected to said second end portion and constructed to being connected to the air bag module;
 said diffuser being crimped onto said inflator ring.

* * * * *